United States Patent [19]

VanDervort et al.

[11] Patent Number: 5,761,191
[45] Date of Patent: Jun. 2, 1998

[54] STATISTICS COLLECTION FOR ATM NETWORKS

[75] Inventors: Cole S. VanDervort, Frederick; Elias E. Fahel, Germantown, both of Md.

[73] Assignee: Telecommunications Techniques Corporation, Germantown, Md.

[21] Appl. No.: 563,552

[22] Filed: Nov. 28, 1995

[51] Int. Cl.$^6$ .................... H04J 3/14; H04L 12/56
[52] U.S. Cl. .................... 370/232; 370/244; 370/250; 370/253; 370/395
[58] Field of Search .................... 370/230, 231, 370/232, 235, 236, 238, 242, 244, 250, 252, 253, 392, 395, 396, 397, 400, 401, 409, 410

[56] References Cited

U.S. PATENT DOCUMENTS

| | | | |
|---|---|---|---|
| 5,117,417 | 5/1992 | Danner | 370/250 |
| 5,140,588 | 8/1992 | Danner | 370/232 |
| 5,179,549 | 1/1993 | Joos et al. | 370/232 |
| 5,179,557 | 1/1993 | Kudo | 370/232 |
| 5,216,669 | 6/1993 | Hofstetter et al. | 370/396 |
| 5,271,000 | 12/1993 | Engbersen et al. | 370/244 |
| 5,278,830 | 1/1994 | Kudo | 370/232 |
| 5,311,513 | 5/1994 | Ahmadi et al. | 370/230 |
| 5,313,455 | 5/1994 | van der Wal et al. | 370/23.2 |
| 5,339,332 | 8/1994 | Kammerl | 370/253 |
| 5,343,463 | 8/1994 | van Tetering et al. | 370/253 |
| 5,390,174 | 2/1995 | Jugel | 370/392 |
| 5,402,426 | 3/1995 | Foglar et al. | 370/232 |
| 5,414,701 | 5/1995 | Shtayer et al. | 370/395 |
| 5,414,707 | 5/1995 | Johnston et al. | 370/395 |
| 5,422,838 | 6/1995 | Lin | 365/49 |
| 5,457,687 | 10/1995 | Newman | 370/232 |
| 5,457,700 | 10/1995 | Merchant | 370/253 |
| 5,497,371 | 3/1996 | Ellis et al. | 370/394 |
| 5,519,689 | 5/1996 | Kim | 370/232 |

FOREIGN PATENT DOCUMENTS 0231967  8/1987  European Pat. Off. .

OTHER PUBLICATIONS

Tekelec Corporation, "ATM Pocket Guide", Publication No. 908–0119–01, Revision B, Jul. 1994.

*Primary Examiner*—Alpus H. Hsu
*Attorney, Agent, or Firm*—Michael de Angeli; Philip Florenzo

[57] ABSTRACT

An instrument for identifying the types of individual cells in a stream of ATM cells by individually examining the cell header and cell payload information of each cell. A microprogram within a microsequencer is vectored responsive to each cell type for updating appropriate statistical counters. Identification of individual cell types by examination of their cell headers on networks operating at speeds of up to 622 Mbps allows numerous network utilization statistics of interest to be gathered.

15 Claims, 3 Drawing Sheets

STATISTICS COLLECTION FOR ATM NETWORKS

CROSS-REFERENCE TO RELATED APPLICATIONS

This application is one of four co-pending applications having generally related subject matter, that is, test instruments and methods for performing testing and measurement functions in ATM networks. The four applications are as follows:

Ser. No. 08/560,117, filed Nov. 17, 1995, for "Rate-Matched Cell Identification and Modification, Replacement, or Insertion for Test and Measurement of ATM Network Virtual Connections"; Ser. No. 08/560,285, filed Nov. 17, 1995, for "Measuring Round Trip Time in ATM Network Virtual Connections"; Ser. No. 08/563,552, filed Nov. 28, 1995, for "Statistics Collection for ATM Networks"; and Ser. No. 08/560,286, filed Nov. 17, 1995, for "Measuring Burst Rate and Burst Size in ATM Network Virtual Connections". The disclosures of the other three applications are incorporated herein by reference.

FIELD OF THE INVENTION

This invention relates to a test instrument containing the invention and methods for collecting important statistics for test and measurement of the operation of asynchronous transfer mode (ATM) communication networks.

BACKGROUND OF THE INVENTION

With the increase in use of computing facilities throughout modern society, and in particular with increased communication over optical fiber-linked networks having far higher transmission speeds than previous conductive wire connections, there is substantial interest in new methods of communication. More particularly, previous communication tended to be segregated between voice and data communication, with different networks being provided for each. Typically voice communication took place over the telephone system, while high speed data communication took place over dedicated lines; data communication is also possible in the telephone system, but only at substantially slower rates than provided by dedicated lines. More recently, digital video and image communications have become of increased interest, particularly for so-called multimedia applications.

The result is that substantial improvements in flexibility of communication techniques are needed, in particular, to permit convenient future upgrading of communication facilities over time as additional data sources become available. Still more specifically, it is imperative that standards be developed and implemented allowing voice, video, images, and data to be transmitted more or less interchangeably over varying transmission media, such that equipment installed at a particular time will not soon be obsolete, but can continue to be used for communication as overall communication speeds are increased in the future.

These needs are largely expected to be met through broad implementation of so-called asynchronous transfer mode (ATM) communication networks. As distinguished from synchronous transfer mode (STM) communications, ATM communication techniques allow the traffic rate from a particular source to be increased or decreased upon demand when communication is desirable. By comparison, in STM, a particular user is assigned particular synchronous transmission time slots on a particular communications medium, limiting the flexibility of the system. The significance of this distinction between asynchronous and synchronous transmission to the invention is discussed further below.

ATM networks are in the process of being installed in conformity with internationally-agreed upon standards for transmission of "cells" of data, including in "data" as used herein digitized voice communication, digitized images, and digitized video, as well as data per se. In ATM, all types of messages to be transmitted are divided into fixed length "cells", each cell including a header including cell payload type and routing information, and a fixed length "payload". The payload of each cell typically contains a relatively small portion of an overall message to be transmitted from a source to a destination. The ATM cells are transmitted by way of a source node into a network comprising a large number of switching nodes connected by communication links. Accordingly, an overall message to be transmitted from an originating source to an ultimate destination is divided into a number of cells, transmitted in sequence over a "virtual connection" established when the communication is established. Each cell transmitted as part of an ATM message transits the same virtual connection, that is, is routed through the same sequence of switching nodes and connecting links.

It is important in effective implementation of ATM networks that the specific type of communication links included in each virtual connection not be a constraint on the format of the ATM cell. That is, the cells of a particular ATM message may be transmitted by wire, by fiber optic cable, by satellite, or by combinations of these. The cell format itself remains unchanged. In this way, flexibility of the network configuration and implementation of future faster communications media can be provided without, for example, rendering obsolete the equipment used to generate cells from messages to be transmitted.

By comparison, according to another modern day communication technology, data is commonly transmitted in the so-called "frame relay" mode, wherein each "packet" transmitted includes the entire message. Hence each packet is of different length. In frame relay transmissions, the packet of data corresponding to the message is preceded by a single header, such that the entire message is transmitted in one long burst over a predetermined route through a series of nodes from a source node to a destination node. This system remains workable, but is relatively inflexible as traffic needs change from time to time. Further, frame relay transmission is best suited for communication of data per se, which tends to be "bursty". Voice and video communication have different intrinsic requirements.

More specifically, communication of data per se is typically time-insensitive, in that some time delay, and considerable variation in the time delay experienced by successive messages or segments of messages, between the time of transmission and the time of reception does not interfere with utility of communication. Voice and video transmissions are by comparison very sensitive to transmission time, in that all portions of the message must be received at a rate closely proportional to the rate at which they are transmitted, if important information is not to be lost. Variation in the delay between segments of a voice or video transmission is particularly disturbing to the receiving party.

In ATM, as noted, messages are divided into relatively small cells which are individually transmitted. For example, a voice communication may be transmitted in cells each effectively encoding single words, or even single syllables. The ATM format allows the individual cells of the message to be transmitted relatively instantaneously, such that they can be reassembled and delivered to a listener or viewer at the destination without perceptible delay. More specifically, because each message is transmitted over its own virtual connection, set up only after determination that the nodes involved have sufficient bandwidth to accommodate the anticipated cell rate, overloads can be avoided and the cell delay minimized.

It therefore will be appreciated that, in essence, an ATM communication involves setting up a virtual connection identifying a sequence of nodes extending between a source and a destination, and dividing the message into cells of equal length. The cells of the message are subsequently transmitted over the virtual connection, which may include each or all of wire conductors, optical links, or satellite relay links. At the ultimate destination, the headers of the cells are removed, the payloads are reassembled, returned to analog format when appropriate (e.g., in voice communication), and delivered to the user.

The basic format of the fixed-length ATM cell (a "cell" corresponding generally to a "packet", as that term is usually used), includes a header consisting of five eight-bit bytes (or "octets"), these including cell payload type and routing information, followed by 48 bytes of payload. Various standards organizations have agreed on the format of the header and the overall cell structure. See, for example, "ATM Pocket Guide", a publication of Tekelec of Calabasas, Calif. As shown therein, and as reproduced by FIG. 4 hereof, the ATM header of each cell includes at least 24 total bits of routing information, comprising 8 bits of "virtual path identifier" (VPI) information and 16 bits of "virtual channel identifier" (VCI) information.

In transmission of ATM cells, the VPI and VCI routing information in each cell header is updated at each node, responsive to predetermined information stored by each node at call origination. The VPI and VCI information stored in each cell at any given time is used by each node to route the cell to the next node in the series of nodes making up the virtual connection, as established at call origination.

More specifically, unlike a frame relay transmission, wherein the header information is unchanged as the packet transits the entire route from its originating source to its ultimate destination, in ATM, the VPI and VCI routing information in the header of each cell is updated as each intermediate node is transited.

As noted, each cell of any given ATM message transits the same virtual connection, that is, the same sequence of nodes. As part of the call origination process, information is stored at each node in the virtual connection, providing VPI and VCI information used to identify each incoming cell and update its VPI and VCI, so that the cell is properly switched to its next destination node in the virtual connection. Thus, as each cell is received at a node, its individual VPI and VCI information is examined by the node, and stored VPI and VCI information needed to convey that cell to the next node is used to update the header accordingly. It will therefore be appreciated that each node in an ATM network includes means for examining the header of each cell received and updating the VPI and VCI information accordingly.

The call origination process in ATM is well defined and need not be detailed here except to mention that when a call is originated, a series of "signaling" messages are passed back and forth between the originating source node, the intermediate nodes, and the ultimate destination node. The call origination process involves the sending of a message of predetermined format, indicating the relevant cell parameters, e.g., the total number of cells to be transmitted, and their anticipated rate of supply. Each node which receives this call set-up message considers the requirements of the call, e.g., the anticipated cell density, and the like, to determine whether it has bandwidth—that is, communications capability—sufficient to handle the anticipated number of cells. During this process each of the intermediate nodes ultimately forming part of the virtual connection to be thus established must in effect agree to the traffic requirements anticipated, and must store sufficient information to allow updating of the VPI and VCI as the cells of that message transit that particular node.

CAM Technology for VPI/VCI Address Compression

As discussed above, each cell includes a header including VPI and VCI fields together comprising at least 24 bits of routing information. This would in theory allow for an enormous number of possible virtual connections to be established. The prior art recognizes that it is unlikely that all this possible information will actually be used, particularly considering that these fields are typically changed at each node along the route, and further recognizes that the examination of so many bits of information at each node is relatively time-consuming.

For example, U.S. Pat. No. 5,414,701 to Shtayer et al discusses the provision of address compression in an ATM system to simplify the table look-up process performed by each node while enabling the VPI and VCI information to be appropriately updated. U.S. Pat. No. 5,422,838 to Lin discusses the use of a content-addressable memory (CAM) with programmable field masking for generally similar purposes.

The Lin patent is of particular interest insofar as it discusses content-addressable memories, which are also used according to the preferred embodiment of the present invention. As indicated by Lin, a content-addressable memory (CAM) is a digital electronic memory circuit capable of storing quantities of digital data which can be simultaneously addressed, that is, searched, in response to an input data word. A CAM typically includes an array of memory cells, each memory cell storing a single data value, the cells being organized into rows and columns. A CAM may output the data values stored in its memory cells when addressed by an input word, similarly to well-known random access memory (RAM). However, unlike RAM, a CAM may also output a "match" signal indicating whether or not a given input word's bit pattern matches any of the data words stored in the entire array, thus providing parallel searching of the stored data words in each row of the array. This parallel searching function facilitates data storage and retrieval in a variety of different applications, and is utilized according to certain embodiments of the present invention.

Lin discusses the use of CAM technology for data packet processing in broad-band integrated services digital networks (BISDN), e.g., ATM networks, and specifically teaches use of CAM for examining the VPI and VCI fields of each cell in an ATM transmission, in order to provide the updated VPI and VCI information required at each node to replace the preexisting VPI and VCI information in each cell. That is to say, the VPI and VCI information of each incoming cell becomes the input to a comparand register of a CAM comprised by each switching node in the ATM network, effectively addressing the CAM. The CAM then outputs the "new" VPI and VCI information for that cell, which is used to update the cell and control transmission of the cell over the network accordingly.

An alternative method of VPI/VCI translation, based on a simple table lookup method, would use a random access memory (RAM) addressed by the incoming VPI/VCI values. The output data lines of the RAM provide the corresponding outgoing VPI/VCI value. While this method of implementation provides for processing speed comparable to that of a CAM, it is not practical for a commercially marketed ATM switching node. This approach would require $2^{24}$ (16,177,216) addressable storage locations, each storing 24 bits of data, a total of over 50 million bytes of RAM. The cost of this amount of memory would drive the cost of the ATM switch well beyond CAM-implemented network switches, overpricing the ATM switch technology to the point of impracticality.

Thus, it will be appreciated that each ATM cell includes VPI and VCI information, essentially routing that cell from one node in the network to the next node along the virtual connection having been established at call origination. Further, it will be appreciated that call origination involves the steps of storing the old and new VPI and VCI information for that particular virtual connection at each node—typically in a CAM, as noted—to be employed for transmission of the cells of a particular message.

Finally, it will be appreciated that CAMs are particularly useful in that their ability to perform high speed comparison of incoming data to stored data permits the VPI/VCI update to be performed at each node at very high cell transmission rates without requiring a very large RAM for table lookup of the new VPI/VCI value, and such that the cells are not delayed unduly at each node by the process. The same capability of CAMs is used for different purposes according to the present invention, as will be discussed in detail below.

Quality Of Service Parameters

ATM users typically will agree with a service provider to provide a certain quality of service, involving, for example, pre-agreed limitations on the cell error ratio, that is, the number of cells including errors that can be tolerated for a given number of cells transmitted, the cell loss ratio, that is, the number of cells that the network may lose for a given number of cells transmitted, as is typically due to oversubscription, and other causes.

The service parameters are agreed upon depending on the anticipated traffic. For example, voice and video communications typically can be effectuated allowing rather higher bit error rates than data communications; voice and video, however, are more sensitive to variation in cell delay than are data communications. Accordingly, these and other parameters must be measured in use, to ensure that the service contracted for is met by both user and service provider.

ATM Traffic Flow Control

Depending on the expected traffic load, ATM users typically will also agree with a service provider to a "traffic contract", involving, for example, pre-agreed limitations on the peak cell rate anticipated, that is, an upper bound on the maximum frequency at which the user expects to transmit cells, the amount of cell delay variation that can be tolerated, the sustained cell rate anticipated, that is, an upper bound on the average frequency at which the user expects to transmit cells for the duration of the connection, and the maximum burst size, that is, an upper bound on the length of a burst of cells which are transmitted at the peak cell rate. Each of these parameters may or may not apply to a given contract, in accordance with the type of traffic anticipated.

In order to control the flow of traffic and maximize the utilization of network resources, it is important to determine whether these parameters are met by both user and service provider. In order to assure compliance, the traffic source node must apply the traffic contract parameters to a "traffic shaping" circuit which limits the transmission of user cells in accordance with the specified parameters. Similarly, within the entrance node of the wide area network, the service provider may implement a "traffic policing" circuit which limits the frequency and burst size of user cell transmission, increasing the cell loss priority or discarding cells that exceed the limits (so-called non-conforming cells), as specified by the traffic contract parameters.

It is desirable to measure specific statistics of the network's operation, such as the frequency of occurrence of various types of cells, in order to optimize network utilization. For example, the cell headers include indications of cell loss priority which can be raised by the network when a user exceeds the parameters of the corresponding traffic contract; the frequency of occurrence of high cell loss priority indication can accordingly be monitored to ensure that the network is not being overutilized.

Objects of the Invention

It is therefore an object of the invention to provide an instrument and method for collecting and processing statistics for measurement and evaluation of network operation.

More particularly, it is an object of the invention to provide an instrument and method for measuring network performance in a high speed (up to 622 Mbps) ATM network, specifically determining statistics for aggregate network utilization, aggregate network utilization per cell type, utilization per virtual channel, utilization per virtual channel per cell type, utilization per virtual path, and utilization per virtual path per cell type. The statistics monitored should include counts of OAM cells, RM cells, and other pertinent parameters.

SUMMARY OF THE INVENTION

The above objects of the invention and others which will appear as the discussion below proceeds are met by the present invention, according to which a test instrument is provided for connection to an ATM network at a node, such as an originating source or ultimate destination node, typically termed a gateway node, or at an intermediate node.

The test instrument containing the invention typically comprises a CAM for examining headers and partial payloads of each cell transiting the node to which the instrument is connected. The CAM is used to identify, for example, assigned cells belonging to specific virtual connections, or for identifying OAM (operations, administration, and maintenance) cells also transmitted by the network from time to time.

The test instrument containing the invention may also be interposed in a network at any given node to measure such parameters as the number of cells having high loss priority, the number of so-called OAM Fault Management cells, the number of cells containing bit errors in the cell header, or the like. More specifically, the header of each ATM cell includes header error correction information, whereby a single bit error in the header can be detected and corrected by each node, in order that the cell is not lost due to the error. The test instrument may similarly perform error detection, in order to determine the number of cells including a header bit in error.

In a preferred embodiment, the test instrument according to the invention comprises a CAM for identifying specific cells by examining the headers of all cells transiting a node. For example, all cells coming from a particular source node and destined for a particular destination node may be identified by the test instrument by examining the VPI/VCI portion of the headers of all cells. This information may be used to identify those cells, e.g., for monitoring transmission parameters. A microsequencer receiving indications of detection of particular cell types or classes of cells from the CAM is used to collect the statistics on network performance.

BRIEF DESCRIPTION OF THE DRAWINGS

The invention will be better understood if reference is made to the accompanying drawings, in which:

FIG. 3, including

DESCRIPTION OF THE PREFERRED EMBODIMENTS

As discussed above, the present invention relates to an instrument for measuring parameters of interest in an ATM communications network, by measuring statistics reflecting the network's utilization on an on-going basis. The following provides certain additional information helpful in understanding the precise nature of the technical problems to be addressed by the invention, prior to discussion of the manner in which the invention resolves these problems.

As indicated above, asynchronous transfer mode (ATM) transmission of data (including in "data" voice, images, and video, digitized as necessary, as well as data per se) involves the segmenting of all messages to be transmitted into equal-length "cells" that are time-multiplexed over a communication link (i.e., cells from plural sources are transmitted in "time slots" as available) at a source. Each cell of a given message is transmitted over the same sequence of nodes and links, termed a "virtual connection", to the destination of the particular message. The virtual connection is established at a call setup time wherein the originating source node sends out a first message including information as to the bandwidth required for transmission of the message. Candidate intermediate nodes then determine whether they can satisfy the bandwidth requirements of the traffic, and may negotiate these parameters if necessary. Ultimately, a virtual connection is established by storing next-node destination information in content-addressable memories (CAMs) or other circuitry comprised by each of the nodes; that is, VPI and VCI information pertaining to each segment of the virtual connection of which a given node is a component is stored at call origination, such that the routing information of each cell is updated as it passes through each of the nodes included in the virtual connection.

As the individual cells of a particular message transit the network, they may be multiplexed several times, e.g., from a relatively low speed local area network into a much higher speed wide area network. The links connecting the nodes may include conductive wires, optical fibers, and/or satellite transmission links. The streams of cells received at the ultimate destination nodes are demultiplexed and presented to the users connected to the ultimate destination node. Because each of the cells of a particular message transits the same sequence of nodes making up the virtual connection, each of the cells should arrive in its proper order. However, commonly the ultimate destination node will assemble the various cells of the message in a buffer, and strip off the header information and other non-message components of the cells, such that the entire message can be accessed in a single operation.

Topology of an ATM Network

Figure 1:
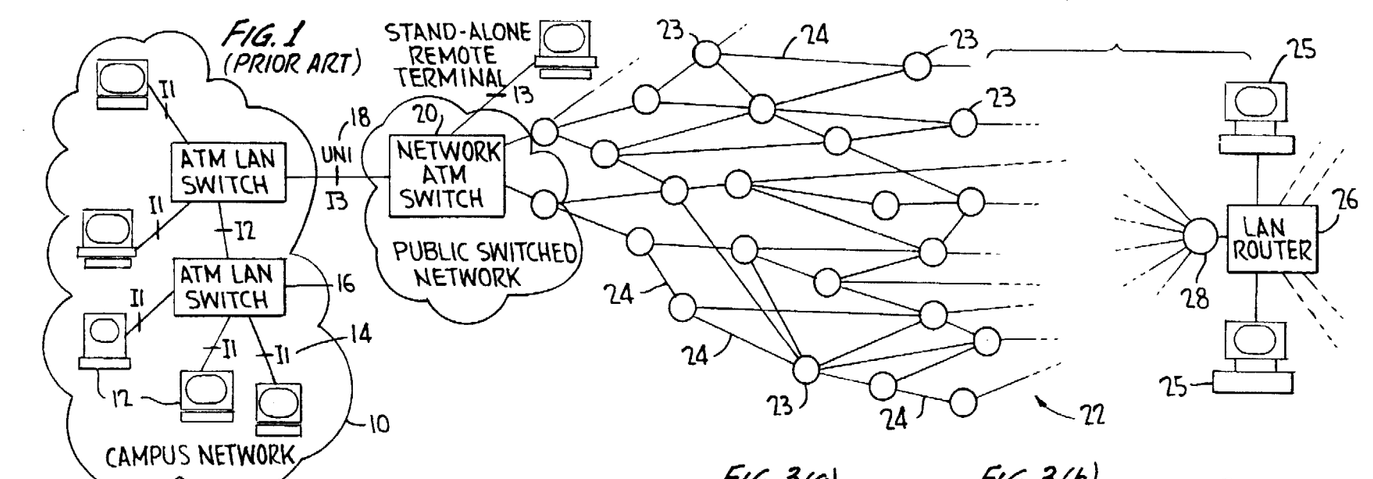
FIG. 1 shows a schematic overview of a network for ATM communication.

FIG. 1 shows in schematic form the overall arrangement of an ATM network, exemplified by the connection of a local area network 10, that is, a number of individual computers 12 interconnected by well-known local area network hardware, to a wide area ATM network indicated generally at 22. For example, a local area network 10 may exist on a college campus or the like, as indicated. The local area network (LAN) comprises a number of individual computers 12 each connected by LAN interface units 14 to ATM LAN switches 16. The ATM LAN switches 16 provide communication between computers 12 of the LAN 10, and also identify cells intended for destinations outside the LAN 10 and convert these to ATM cells, a process which will be detailed further below. LAN 10 is connected by an ATM user network interface 18 to wide area network 22 by way of an ATM switch 20. Network ATM switch 20 is thus a "gateway" node to the wide area ATM network 22. Network 22 comprises a large number of intermediate nodes 23 connected by a large number of links 24. ATM traffic may also be originated by digital telephone equipment, video conference equipment, or other known devices.

As indicated above, various nodes 23 transmit at differing transmission rates and are connected by correspondingly-varied media, i.e., links 24. Low speed nodes may be connected by wire conductors; more commonly, and especially in new installations, optical fibers are being used to connect high speed nodes so as to enable very high speed data transmissions from point to point. Satellite links may also connect various nodes.

As noted above, as a rule, an overall message to be transmitted over the ATM network, which may be a few seconds of digitized voice or video, or data per se, is divided into a large number of cells of identical format. The individual cells are generated by an ATM switch serving as a gateway node 20. Each cell is provided with initial VPI and VCI information at the gateway node, which is used to direct it to the first intermediate node in its virtual connection. As the cells transit the wide area network 22, their VPI and VCI information is updated at each node 23 until the cells reach a similar network ATM switch serving as a destination node 28 connected to the ultimate destination of a particular message. The ultimate destination may be a computer 25, similarly part of a local area network by virtue of being connected to a LAN router 26, in turn connected to destination node 28. As indicated, the structure and operation of the ATM network is well known and is defined by a variety of different standards describing the interfaces between the various classes of nodes, links, LANs, and other components involved.

Figure 2:
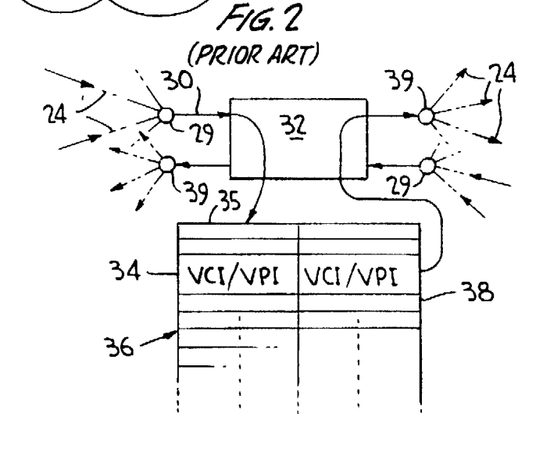
FIG. 2 shows a schematic diagram of the mechanism whereby a node updates the VPI and VCI information of each ATM cell it processes.

FIG. 2 shows schematically the updating of each cell at each node in a normal ATM connection. Cells arriving on an incoming line 30 reach the node 32. More specifically, streams of incoming cells are received over a plurality of links 24, and are multiplexed by a switch 29 to provide a single stream of cells via line 30, to each node 32. Each incoming stream of cells will typically include cells from a number of virtual connections. As discussed above, and in further detail below, each ATM cell includes a 5-byte header, including VPI and VCI routing information identifying the next node in the virtual connection established for the cells of each message.

The VPI and VCI of the incoming cells, shown schematically at 34, are supplied to the comparand register 35 of (typically) a content-addressable memory (CAM) 36. When correspondence between the VPI and VCI of the incoming cell and the contents of the CAM 36 is detected, the CAM outputs updated VPI and VCI routing information from data stored at 38 at call set-up with respect to each virtual connection. The new VPI and VCI then become part of the header of the outgoing cell, and are used to similarly identify the cell at the next node. A multiplexing switch 39 forming the connection of each node to a plurality of outgoing links 24 is controlled such that each cell is transmitted over the correct link to reach the next node in the virtual connection.

Thus, as discussed above, at each node in a virtual connection, the VPI and VCI of the incoming message are updated to indicate the next node in the network to which that particular cell is to be transmitted. The correspondence between the "incoming" and "outgoing" VPI and VCI information is established at call origination and stored in each node forming part of a virtual connection established for each message by exchange of a sequence of call set-up messages between an ultimate source node and an ultimate destination node. While the capability of updating the VPI and VCI routing information of each cell at each node can be provided using other circuit components, currently-preferred node designs typically use CAMs in each node to provide the VPI and VCI updating at very high speed. Nodes having this capability are within the skill of the art as of the time of filing of this application. See U.S. Pat. Nos. 5,414,701 to Shtayer and 5,422,838 to Lin.

In the embodiment shown, the nodes themselves each comprise routing intelligence, that is, for responding to call set-up messages to establish virtual connections. However, the invention would also be useful in evaluating a network designed such that one or more central routers determined the sequence of nodes and links to be traversed by the cells of each message, i.e., to define the virtual connections.

Methods Of Test Access

Figure 3A:
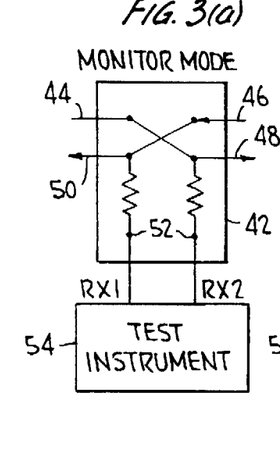
FIGS. 3(a)–3(c), shows three possible methods of connecting a test instrument to the test access port of a network node.
Figures 3B, 3C:
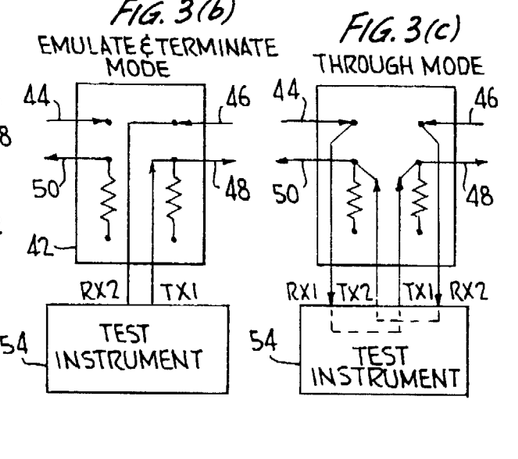

FIGS. 3(a)-3(c) show three different methods whereby a test instrument according to the invention can be connected to a conventional preexisting node 42 of an ATM network, using, in this example, electrical wire connections. As shown, node 42 is connected to two incoming lines 44 and 46 and two corresponding outgoing lines 48 and 50, respectively. As shown in FIG. 3(a), the test instrument 54 may be connected to two test port terminals 52 in a "monitor" mode of operation of the test instrument of the invention. In this mode, network service is undisturbed; the test instrument simply monitors traffic through the node and may perform various tests, maintain network operation statistics, and the like, without affecting flow of traffic.

In an "emulate and terminate" mode shown in FIG. 3(b), the test instrument effectively terminates incoming line 46 and originates traffic over transmit line 48. In this mode of operation, the test instrument effectively takes the node out of service.

Finally, in a third "through" mode, shown in FIG. 3(c), the test instrument is interposed in the traffic path between the incoming lines 44 and 46 and the corresponding outgoing lines 48 and 50.

In the "through" mode, all traffic passing through node 42 is delayed by a fixed period of time, typically an integral number of cell time slots, varying with the rate of transmission of the cells at that particular point in the network, to enable test instrument 54 to carry out the appropriate processing steps. It will be apparent that it is desirable that all traffic be delayed identically so that the order of cell transmission is not disturbed, which would interfere with reassembly of the cell payloads into coherent messages. Further, it is important that the delay be as short as possible.

Note that networks linked by high speed fiber optic lines may be accessed in a conceptually similar way, although there are no currently standardized methods for providing test access to nodes in fiber optic networks.

In each of FIGS. 3(a)-3(c), and below, the ports at which the test instrument 54 receives traffic from the node are labeled RX1 and RX2, while the ports through which the test instrument transmits data back to the node for transmission over the network are referred to as TX1 and TX2.

The statistics processor of the present invention operates in all of the aforementioned test access modes.

Format of an ATM Cell

Figure 4:
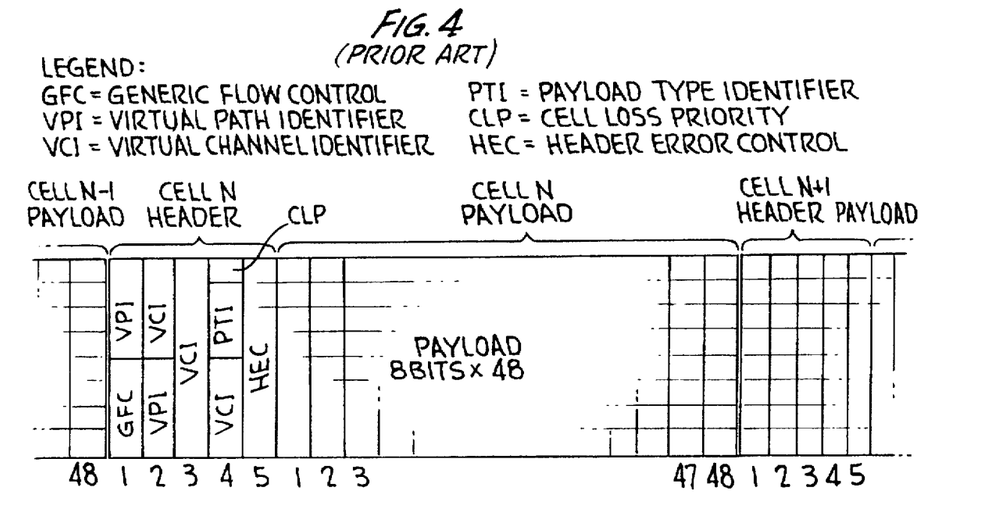
FIG. 4 shows schematically the layout of a typical ATM cell according to the standardized ATM format used in the industry.

FIG. 4 shows the format of the typical ATM user cell. As discussed above, each ATM cell includes 53 8-bit bytes, that is, includes a 5-byte header and 48 bytes of payload. The payload may contain user data in the case of normal user cells or control information, in the case of operations, administration, and maintenance (OAM) or resource management (RM) cells. The individual cells in a stream of cells may be separated by additional cell delineation bytes of predetermined format, depending on the precise medium of transmission being employed.

Within a LAN, and at the ATM User Network Interface (UNI) 18 (FIG. 1), the first byte of the header includes four bits of generic flow control (GFC) information, followed by four bits of virtual path identifier (VPI) information. Within the wide area network, the GFC bits are typically replaced with four additional VPI bits. VPI information also makes up the first four bits of the second byte, which is followed by four bits of virtual channel identifier (VCI) information. All eight bits of the third byte of the header include VCI, as do the first four bits of the fourth byte. The 24 (or 28) total bits of VPI and VCI together comprise routing information for the cell. Where the cell is an unassigned or idle cell, the VPI and VCI bits are all set to zero. The fifth, sixth, and seventh bits of the fourth byte of the cell header are payload type identifier (PTI) bits, which typically indicate whether the payload of the cell includes user data, whether the segments of the network through which the cell has traveled have experienced congestion and the like, or whether the cell is a "OAM" cell, used for control of network operation, administration, and maintenance. The last bit of the fourth byte is a cell loss priority (CLP) bit, a "1" indicating that the cell is subject to discard in the event of network congestion or the like. Where the VPI and VCI fields are all zeroes, the CLP bit differentiates between idle and unassigned cells. Finally, the fifth byte of the header includes header error control (HEC) data used to reconstruct the header if a single bit error is detected within the cell header by any of the nodes along a virtual connection.

Again, as discussed above, the VPI and VCI information included in the header of each ATM cell is updated at each node as the cell transits its virtual connection from its originating source node to its ultimate destination node. More specifically, each node stores VPI and VCI information corresponding to each virtual connection then being supported. When the sequence of nodes making up the virtual connection is determined at call origination, the VPI and VCI information of the incoming cells is stored by each node in association with the corresponding VPI and VCI information to be written into the header of each cell, so as to update the network routing information of each cell as each node is transited.

Contrasting Switched and Permanent Virtual Connections

The VPI and VCI information is normally arbitrary, in that it cannot be analyzed to identify the ultimate source of the cells, to identify the position of a cell in a sequence of cells, or the like. The VPI and VCI information also does not include a virtual connection identifier per se. However, it will be appreciated by those of skill in the art that certain VPI and VCI values are "reserved", e.g., for call origination messages. Candidate nodes identify the reserved VPI and VCI of call origination messages in order to respond to the call set-up query, i.e., to determine whether they can serve as part of a proposed virtual connection. Certain "permanent" virtual connections (as opposed to "switched" virtual connections established at call origination, as described) may also be established by permanent VPI and VCI assignments. Further, individual service providers may employ parts of the VPI field to indicate levels of service and the like.

Test Instrument Functional Description

Figure 5:
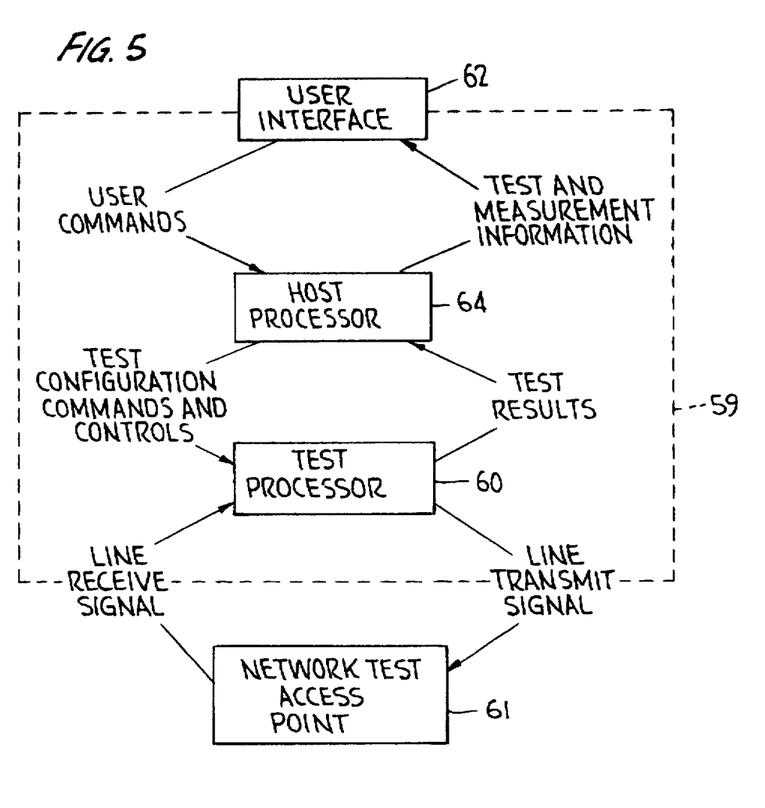
FIG. 5 illustrates the overall architecture of a test instrument according to the invention.

FIG. 5 shows a block diagram of the principal components of a test instrument for carrying out the functions provided according to the invention. The processing steps required to carry out the various tests made possible according to the invention are performed in main part by a test processor 60 monitoring cells received from an associated node at a network test access point 61.

The specific operations to be carried out by the test processor 60 are controlled by a user providing commands by way of a user interface 62 which is in turn connected to test processor 60 by a host processor 64, providing the user with the ability to specify the type of test to be performed. Host processor 64 provides substantial processing capability with respect to test results and the like received from test processor 60. Test instruments including a user interface, a test processor, and a host computer are generally known; the invention in this case generally resides in the specific functions provided by and structure of the test processor 60.

As discussed, the test processor 60 identifies specific cells in a stream of cells by comparison of the VPI and VCI fields of each cell to information stored in the test processor. The stored information is provided by the user, who (for example) would key the information into the host 64 by way of a keyboard comprised by the user interface 62. The user in turn may obtain the VPI and VCI information from a system administrator, who assigns this information to each new virtual connection. The instrument may also store VPIs and VCIs received for a period of time, building a list of active connections. The user may then select one for analysis. A virtual connection may also be established specifically in order to test specific aspects of network operation, and the VPI and VCI then communicated to the user at the test instrument.

Relation to Copending Applications

Control of the particular operation to be performed by the instrument of the invention at any given time is controlled responsive to user commands provided to host processor 64 connected in turn to test processor 60. For example, a time stamp may be added to a test cell as part of measurement of its round trip travel time. See co-pending Ser. No. 08/560, 285.

The instrument of the invention comprises a cell filter, which can be implemented in at least two ways. In both cases, the basic function of the cell filter is to compare stored VPI and VCI information, for example, representative of cells belonging to a particular virtual connection, to the VPI and VCI of each incoming cell. Where cells belonging to a particular virtual connection need simply be identified, e.g., for replacement with test cells or for modification, as in Ser. No. 08/560,117, or for measurement of the size and rate of bursts of cells from a particular virtual connection (see copending Ser. No. 08/560,286, the cell filter may be implemented by combinatorial logic, for example, a number of exclusive-OR gates. See Ser. No. 08/560,117. Where one or more characteristics of the cells are to be monitored, or where cells from a number of virtual connections are to be identified, as in the present invention, a content-addressable memory (CAM) is the preferred implementation of the cell filter, as discussed in detail below.

The OSI Seven Layer Model

The instrument of the invention comprises a receiver performing functions usually termed part of the "physical layer" of a communication device. The "physical layer" nomenclature refers to the first layer of a seven-layer industry standard model of communications referred to as the "Open Systems Interconnection" (OSI) model. The OSI model and its relation to the present invention are discussed more fully in copending Ser. No. 08/560,117.

Microsequencing Technology

Microsequencers, that is, hardware components with "embedded" software routines for performing specific functions at high speeds, are used in the prior art as control units in various digital systems to initiate repetitive sequences of micro-operations. Microsequencers used as control units in computers execute sequences of micro-operations, for example, to fetch an instruction from main memory, evaluate the effective address, execute the instruction, and return control to the main program. The principal advantage is very high speed execution of well-defined tasks.

Figure 6:
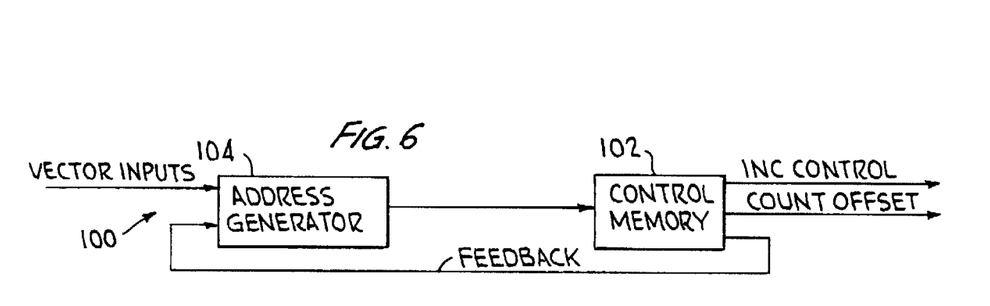
FIG. 6 shows schematically the operation of a microsequencer employed in one embodiment of the present invention.

As shown in FIG. 6, a microsequencer 100 is typically composed of a control memory 102, which stores a microprogram composed of routines, and an address generation circuit 104. Each stored routine is composed of a set of microinstructions dedicated to perform a task. Each microinstruction has two components, a part which executes a micro-operation, and another part fed back to the address generator 104, to select the next microinstruction. The address generation circuit then provides the next address to the control memory, which provides the next microinstruction, and so on. The initial "vector" inputs to the address generator come from external circuits, providing a full or a partial starting address to the microsequencer. The feedback signal also affects the choice of the next address. For example, the feedback signal can cause the address generator 104 to increment the prior address to access the next microinstruction, or to branch to a new address in control memory 100.

Figure 7:
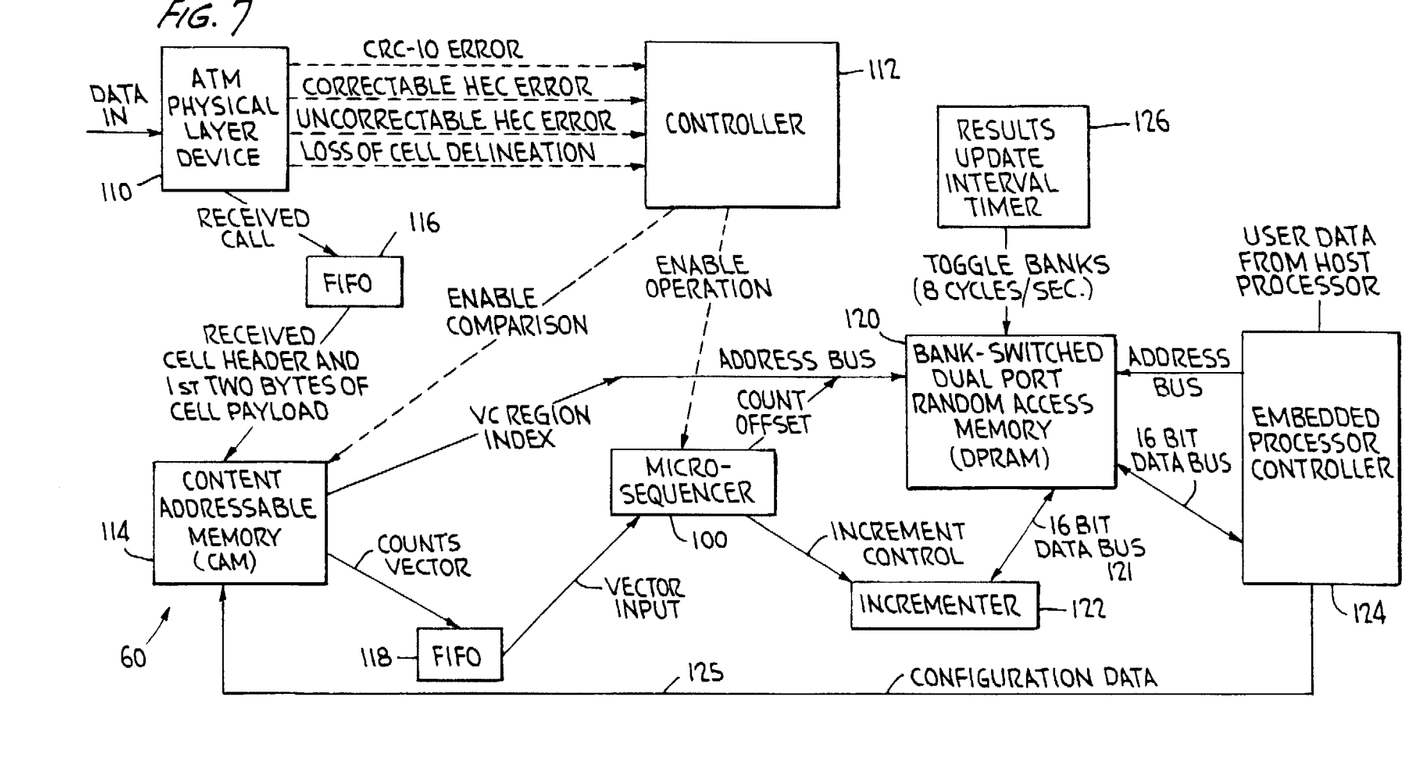
FIG. 7 illustrates a functional block diagram of a statistics processor according to the invention, showing schematically the principal steps in ATM statistics collection according to the invention.

A microsequencer 100 as illustrated in FIG. 6 forms part of the overall test processor 60 of the invention, as detailed in FIG. 7. As employed in a preferred implementation of the present invention, microsequencer 100 receives vector inputs from a CAM. The vectors are provided to an address generator 104 responsive to examination of each incoming cell, to select the correct starting address in a control memory 102. Control memory 102 accordingly provides microinstructions controlling incrementing of appropriate memory locations corresponding to the cell types, virtual connection types, and aggregate network cell types corresponding to the cell identification. Table I provides an exemplary list of all types of cells as to which statistics are maintained according to one implementation of the invention.

More specifically, the control memory 102 provides Count Offset, Incrementer Control, and Feedback signals. The Count Offset signal forms the less significant part of the address to a memory device storing running totals of the counts, that is, the Count Offset signal specifies the address of the stored count value(s) to be incremented. The Increment Control signal initiates the process of incrementing the count being addressed by the Count Offset signal. The Feedback signal is supplied to address generator 104 to control the addressing of the next microinstruction in control memory 102.

Statistics Processing

FIG. 7 provides a block diagram of the principal components of the test processor 60 as used in implementing the present invention. An ATM physical layer device 110 is used to extract cells from the physical layer of the network. The physical layer device 110 provides certain indicator control signals to the a controller 112. These signals indicate the occurrence of certain types of error, including cell payload transmission (CRC-10) errors detected using cyclic redundancy check (CRC) bits, correctable or uncorrectable errors in the header, both detected using header error control (HEC) bits (FIG. 4), or loss of cell delineation (i.e., inability to locate the beginning and endings of successive cells). A Loss Of Cell Delineation signal halts all processing of the statistics processor, until cell delineation is reestablished. Uncorrectable and Correctable HEC error indications are passed on to the microsequencer to be counted; uncorrectable HEC error indicators further invalidate the filtering process carried out by the CAM on all cells, such that no other counters are incremented with respect to that particular cell. CRC-10 cell payload errors, that is, signals indicating detection of errors in the cell payload, are also counted by the microsequencer, and disable the counts associated with cell payloads, e.g., the counts maintained of various sub-types of OAM cells, RM cells, and AAL3/4 cells, the latter referring to classes of service provided.

Controller 112 can be implemented as a state machine, i.e., a series of logical elements arranged to step along possible predetermined paths and having specified outputs at each step in response to sets of particular input values. The output signals provided by controller 112 may include an Enabling Comparison signal controlling comparison of valid received cell data to stored categories of data by the CAM 114, and an Enable Operation signal provided to microsequencer 100, as shown. Controller 112 may also pass HEC Error signals, CRC Error signals and the like to microsequencer 100 for counting.

Each received cell is stored in a first in-first out (FIFO) buffer memory 116 in preparation for cell filtering by a content-addressable memory (CAM) 114. The CAM 114 effectively filters the cells in order to identify those of particular interest. As discussed above, cell identification and filtering are performed by supplying a portion of each cell (in a preferred embodiment, including the VPI and VCI, the payload type identifier and cell loss priority bits, and part of the cell payload) to the comparand, i.e., address, register of the CAM 114. Cell identifying information, again at least the VPI and VCI of cells belonging to virtual connections of interest, is stored in CAM 114, typically responsive to user input from user interface 62 (FIG. 6), provided to the CAM via embedded processor controller 124, as indicated at 125.

CAM 114 determines whether the corresponding bits of each received cell match any of the information stored in the CAM. If a match is detected, indicating, for example, detection of an OAM cell received from a particular virtual connection of interest, a VC Region Index signal and a Counts Vector signal are provided by CAM 114, that is, those signals form the associated data field of the matched entry. The Counts Vector signal is stored by a rate-decoupling FIFO 118, and becomes an input signal to an address generator 104 comprised by microsequencer 100 (see FIG. 6); that is, the Counts Vector signal becomes a Vector input signal selecting a microsequencer subroutine needed to increment the appropriate counter values. The VC Region Index signal is effectively a compressed version of the VCI/VPI address, and is used to select a memory region in a dual port random access memory (DPRAM)120. DPRAM 120 contains the count values used to record network operational statistics; those associated with a particular virtual connection are all accessed by the VC Region signal, with individual counts selected by the Count Offset signal. Stated differently, the VC Region index signal is used to select the region in memory 120 maintaining counters for the aggregate network traffic. It will be appreciated that the number of virtual connections which can be supported is limited by the size of the VC Region Index, e.g. an 8-bit VC Region Index signal supports simultaneous maintenance of count values with respect to each of up to 256 virtual connections.

Microsequencer 100 operates to maintain various statistics stored by the dual-port random access memory (DPRAM) 120 by generating the appropriate count offset addresses corresponding to the statistical counts to be incremented, causing the previously stored count values to be read from the addressed memory locations in DPRAM 120, and supplied via a 16-bit data bus 121 to an incrementer 122 for incrementing. The incremented values are then stored back in their original locations in DPRAM 120.

An embedded processor controller 124 extracts the stored results from DPRAM 120 periodically, responsive to a toggling signal provided by a results update interval timer 126. For example, in monitoring a 155.52 Mbps network, the results update interval (i.e., the interval at which the stored values are read and reset to zero) must be at least equal to 8 cycles per second, to assure that none of the 16-bit counter values stored by DPRAM 120 will overflow. Adjustments to counter value sizes in DPRAM 120 and results update intervals are required to support lower or higher speed networks.

As indicated, the DPRAM 120 is bank-switched, that is, two copies of all of the counted values are maintained by the DPRAM corresponding to the virtual connections being monitored. Each copy occupies a different bank. This allows microsequencer 100 to continue to increment counter values in one bank while embedded processor controller 124 extracts the results from the other bank. As noted, a clock signal from results update interval timer 126 causes the banks to toggle.

The monitored counts, that is, the statistics that are maintained, are typically used to track network utilization, such as the number of high priority cells received with respect to each virtual connection being monitored. Table I following identifies one set of statistics that may be maintained, for monitoring operation of the network according to the invention.

As indicated by the three columns of Table I, cell type statistics are maintained for each virtual connection (VC) (column 1) for reserved VCs, for monitoring use of reserved VCs (e.g., for call set-up messages, OAM cells, and the like (column 2), and in the aggregate (column 3). The individual cell types listed and selected by the counter offset address in each row of the table are identified by the ATM publications mentioned above and will be familiar to those of skill in the art.

The counts contained in Table I are accumulated in the test processor 60 of FIG. 5 and passed as test results to the host processor 64 at regular time intervals. The host processor 64 will add test results from the latest time interval to previously accumulated results. In addition, the host processor 64 performs various arithmetic operations such as adding, subtracting, multiplying, or dividing categories of results, in order to derive other result categories. The host processor 64 then filters and formats the test results and passes test and measurement information to the user interface 62.

The following is an example of the results processing which may be provided by the test instrument of the invention. As shown in the first two rows of Table I, corresponding to counter offset addresses 0 and 1, CLP=0 and CLP=1 counts (that is, counts of cells having their CLP bit set to 0 or 1 respectively) are accumulated with respect to a particular VC in column 1; this category is therefore called Cell Type Counter Maintained for each VC Region Address. The information is stored in DPRAM 120 of FIG. 7 during the time interval controlled by the results update interval timer 126. At the end of the results update interval as controlled by timer 126, the CLP=0 and CLP=1 counts (and others) are read by embedded processor controller 124 and added to the corresponding previous CLP=0 and CLP=1 counts. The new CLP=0 and CLP=1 counts are added together to derive a total VC cell count. The CLP=0 count is divided by the total VC cell count and multiplied by 100 to derive the percentage of cells having high priority. The percentage of high priority cells is presented to the user interface for display.

TABLE I

| 1<br>Cell Type<br>Counters<br>Counter Maintained For<br>Offset Each VC Region<br>Address Address | | 2<br>Reserved<br>Virtual<br>Connection Cell<br>Type Counters | 3<br>Aggregate<br>Network Cell<br>Type Counters |
|---|---|---|---|
| 0 | CLP = 0 | CLP = 0 | CLP = 0 |
| 1 | CLP = 1 | CLP = 1 | CLP = 1 |
| 2 | Uncongested | Uncongested | Uncongested |
| 3 | Congested | Congested | Congested |
| 4 | AAL5 EOM | AAL5 EOM | AAL5 EOM |
| 5 | OAM F5 Segment | OAM F5 Segment | OAM F5 Segment |
| 6 | OAM F5 End-to-End | OAM F5 End-to-End | OAM F5 End-to-End |
| 7 | In-Band RM | In-Band RM | In-Band RM |
| 8 | Out-of-Band RM | Out-of-Band RM | Out-of-Band RM |
| 9 | Reserved | Reserved | Reserved |
| 10 | OAM PM | OAM PM | OAM PM |
| 11 | OAM FM | OAM FM | OAM FM |
| 12 | OAM A/D | OAM A/D | OAM A/D |
| 13 | OAM SM (Sys Mgmnt) | OAM SM (Sys Mgmnt) | OAM SM (Sys Mgmnt) |
| 14 | AAL3/4 BOM | AAL3/4 BOM | Unused |
| 15 | AAL3/4 COM | AAL3/4 COM | Unused |
| 16 | AAL3/4 SSM | AAL3/4 SSM | Unused |
| 17 | AAL3/4 EOM | AAL3/4 EOM | Unused |
| 18 | Congested RM | Congested RM | Congested RM |
| 19 | No Increase RM | No Increase RM | No Increase RM |
| 20 | ACR Increase RM | ACR Increase RM | ACR Increase RM |
| 21 | Forward RM | Forward RM | Forward RM |
| 22 | Backward RM | Backward RM | Backward RM |
| 23 | Unused | Unused | Unused |
| 24 | Unused | Unused | Unused |
| 25 | Unused | Unused | Invalid Cell (different types) |
| 26 | Unused | Unused | GFC /= 0 |
| 27 | RM CRC-10 Error | RM CRC-10 Error | RM CRC-10 Error |
| 28 | OAM CRC-10 Error | OAM CRC-10 Error | OAM CRC-10 Error |
| 29 | AAL3/4 CRC-10 Error | AAL3/4 CRC-10 Error | Unused |
| 30 | AAL3/4 Length Error | AAL3/4 Length Error | AAL3/4 Length HEC |
| 31 | Correctable HEC | Correctable HEC | Correctable HEC |

It will thus be appreciated that statistics are maintained according to the invention using a CAM 114 to identify cells by comparing at least part of the header (and in some cases part of the payload) of each received cell to stored information identifying, for example, particular virtual connections and cell characteristics of interest. When a match is detected by CAM 114, a Counts Vector signal provides an address to a microprogram stored by microsequencer 100. The microsequencer 100 reads each Counts Vector from the FIFO 118 in order to select and activate a corresponding microprogram. Each microprogram in turn provides a list of addresses of the appropriate counts in DPRAM 120 to be incremented. Thus the counts stored by the DPRAM 120 corresponding to the cells of interest are incremented by the microsequencer 100. The current value for each count to be incremented is retrieved from DPRAM 120, incremented by an incrementer 122, and written back to its assigned location in DPRAM 120. Stated more generally, the CAM 114 examines the pertinent fields of each incoming cell and provides the microsequencer 110 with information identifying the counts to be incremented. The microsequencer then causes the correct counts located in DPRAM 120 to be read therefrom, incremented, and stored back into DPRAM 120.

At intervals controlled by timer 126, the values for each count are read and cleared from DPRAM 120 by controller 124. In the preferred embodiment, DPRAM 120 is implemented as a dual-port random access memory, divided into two banks which are organized identically; the most significant address line which is used to toggle access between the banks. Toggling is initiated by a Toggle Banks signal provided by the results update interval timer, implementing a "bank switching" function. The bank switching function allows one bank of the memory to be read by the embedded processor controller while the microsequencer is simultaneously incrementing counts stored in the other bank. The toggling interval, as controlled by the results update interval timer, must occur frequently enough to prevent the counters contained inside the DPRAM from overflowing, resulting in a loss of data, e.g., due to a continuous stream of cells of a single type. The embedded processor controller 124 may be used to generate additional "derived statistics" by mathematically combining the results read from the dual port memory.

While a preferred embodiment of the invention has been described in detail, and numerous examples of its operation have been given, it will be appreciated by those of skill in the art that these are merely exemplary and that other implementations of these and various further aspects of the invention are also within its scope and extent. The invention is therefore not to be limited by the above exemplary disclosure, but only by the following claims.

What is claimed is:

1. An instrument for measuring statistical characteristics of traffic in an asynchronous transfer mode communication network comprising a number of traffic sources and destinations connected by switched nodes, such that messages to be transmitted are divided at their source into one or more cells each comprising a header of predetermined format and a payload of predetermined length, said header including message type, message priority, and routing information, said instrument comprising:

means for connecting said instrument in order to monitor the stream of traffic passing through one of said nodes, such that said instrument is capable of detecting at least specified information with respect to the header of each cell traversing said node;

means for examining said header information of each cell, to determine one or more of the message type and message priority information contained therein, with at most a minimal fixed delay in passage of said traffic through said node;

means for classifying each cell responsive to the message type and message priority information comprised in the header thereof; and means responsive to said means for classification for counting cells of predetermined classes in a stream of cells wherein said means for examining said header information includes a content addressable memory means wherein at least a portion of said header information of each cell traversing said node is provided to a content addressable memory.

2. The instrument of claim 1, wherein said means for classifying each cell comprises content-addressable memory means comprised by said test instrument for providing an indication of the classification of each cell as output to said means for counting cells of predetermined classes responsive to said header information.

3. The instrument of claim 2, wherein at least a portion of the payload of each cell traversing said node is also provided to a comparand register of said content-addressable memory.

4. The instrument of claim 2, wherein said means for counting cells of predetermined classes responsive to said header information comprises microsequencer means for controlling storage of counts of cells of predetermined classes, and for incrementing said stored counts of cells responsive to said indication of the classification of each cell received from said content-addressable memory.

5. The instrument of claim 2, wherein said content-addressable memory further examines the routing information of each cell to permit monitoring of the frequency of transmission of cells to various destinations.

6. The instrument of claim 2, wherein said header further includes error detection and correction information, and said instrument comprises means for detection of errors in said header information, and for counting the number of cells including errors.

7. A method for obtaining statistical information describing a stream of cells in an asynchronous transfer mode (ATM) communication network, wherein messages to be transmitted are divided at their source into one or more cells each comprising a header of predetermined format and a payload of predetermined length, said header including message type, message priority, and routing information, each cell of a given message being transmitted over a single virtual connection between its source and destination, comprising the steps of:

connecting a test instrument capable of examining the headers of cells in real time to a test port defined by a node in said network;

employing said instrument to examine at least the headers of each cell, and to classify each cell as to its message type and message priority; and counting the types of cells of various classes passing through the node in a given period of time, and their priority levels wherein said step of examining is performed by providing at least a portion of said header information of each cell to a comparand register of a content addressable memory.

8. The method of claim 7, wherein said step of classifying is performed by providing at least said header information of each cell to a comparand register of content-addressable memory comprised by said test instrument, said content addressable memory providing and indication of the classification of each cell to means for counting cells of predetermined classes.

9. The method of claim 8, wherein at least a portion of the payload of each cell is provided to said comparand register.

10. The method of claim 8, wherein the header of each cell further includes information for the performance of error detection and correction at said nodes, and said instrument further comprises means for error detection with respect to said header information, the method further comprising the step of counting the number of cells including errors by monitoring the operation of the means for error detection.

11. A statistics processor for employment in a test instrument for monitoring operation of an asynchronous transfer mode (ATM) communication network, wherein messages are transmitted as a series of cells each comprising a header of fixed format and a payload of defined length, said header including cell routing and cell type identification information, comprising:

a cell filter for comparing at least a predetermined portion of each cell in a stream of cells to stored information identifying one or more classes of cells of interest by specifying one or both of cell routing and cell type identification information, and for providing a cell identification signal responsive to said comparison;

a microsequencer for responding to said cell identification signal from said cell filter by providing a count offset signal to a random-access memory storing counts of cells of various classes being monitored, and an increment control signal to an incrementer, said random-access memory responsive to said count offset signal by retrieving a corresponding stored count and providing said retrieved stored count to said incrementer, and said incrementer incrementing the retrieved stored count by one responsive to said increment control signal.

12. The statistics processor of claim 11, wherein said cell identification signal is buffered in a rate-decoupling first in-first out buffer after being provided by said cell filter and before supply to said microsequencer.

13. The statistics processor of claim 11, wherein said cell filter is a content-addressable memory capable of storing a plurality of sets of one or both of cell routing and cell type identification information corresponding to a plurality of cell types to be monitored, for simultaneously comparing said stored plurality of sets of one or both of cell routing and cell type identification information to the corresponding portions of each incoming cell, and for providing said cell identification signals responsive thereto.

14. The statistics processor of claim 11, further comprising a controller for accessing the counts values stored in said random access memory and supplying said values to a user.

15. The statistics processor of claim 14 wherein said random access memory is a bank-switched dual port random access memory providing two locations in said memory for storage of each type of count values, whereby said microsequencer can access and increment said stored count values via a first port while a embedded processor reads the stored count values via a second port.

* * * * *